United States Patent
Tang

(10) Patent No.: US 11,019,609 B2
(45) Date of Patent: May 25, 2021

(54) WIRELESS-NETWORK-BASED COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/097,343

(22) PCT Filed: Jul. 15, 2016

(86) PCT No.: PCT/CN2016/090228
§ 371 (c)(1),
(2) Date: Oct. 29, 2018

(87) PCT Pub. No.: WO2018/010184
PCT Pub. Date: Jan. 18, 2018

(65) Prior Publication Data
US 2019/0141682 A1 May 9, 2019

(51) Int. Cl.
*H04W 74/00* (2009.01)
*H04W 72/04* (2009.01)
*H04W 24/08* (2009.01)

(52) U.S. Cl.
CPC ......... *H04W 72/042* (2013.01); *H04W 24/08* (2013.01); *H04W 74/006* (2013.01)

(58) Field of Classification Search
CPC ........... H04W 72/0406; H04W 72/042; H04W 72/0446; H04W 72/0453; H04W 72/1278;
(Continued)

(56) References Cited

U.S. PATENT DOCUMENTS 9,807,747 B2 * 10/2017 Hsieh ................. H04W 72/042
2010/0331030 A1   12/2010 Nory
(Continued)

FOREIGN PATENT DOCUMENTS

CN    101516104 A    8/2009
CN    102714879 A    10/2012
(Continued)

OTHER PUBLICATIONS

First Office Action of Chinese application No. 201680086189.8, dated Sep. 3, 2019.
(Continued)

*Primary Examiner* — Kevin D Mew

(57) ABSTRACT

Provided in the embodiments of the present invention are a wireless-network-based communication method, terminal device, and network device. The method comprises: a terminal device detecting first downlink control information (DCI) sent by a network device; a terminal device detecting second DCI sent by a network device; the terminal device joining control information of the first DCI and second DCI so as to send or receive target data. In the embodiments of the present invention, the first DCI and second DCI may carry different types of control information; separately transmitting the first DCI and second DCI satisfies the requirements for transmission of different types of control information; insofar as the requirements for transmission of different types of control information are satisfied, different types of control information are transmitted to the terminal device, such that the terminal device can send or receive target data.

20 Claims, 8 Drawing Sheets

(58) Field of Classification Search
CPC ......... H04W 72/1289; H04W 72/1294; H04W 74/002; H04W 74/006; H04W 24/08
See application file for complete search history.

(56) References Cited

U.S. PATENT DOCUMENTS

| | | | |
|---|---|---|---|
| 2011/0038271 A1* | 2/2011 | Shin | H04W 52/08 370/252 |
| 2013/0155872 A1 | 6/2013 | Subramanian | |
| 2013/0188505 A1 | 7/2013 | Nory | |
| 2013/0195041 A1* | 8/2013 | Papasakellariou | H04W 72/042 370/329 |
| 2013/0208690 A1* | 8/2013 | Nishikawa | H04L 5/0091 370/329 |
| 2013/0259011 A1* | 10/2013 | Nakashima | H04W 72/0473 370/336 |
| 2013/0301548 A1* | 11/2013 | Etemad | H04B 7/065 370/329 |
| 2014/0086184 A1 | 3/2014 | Guan et al. | |
| 2014/0133440 A1* | 5/2014 | Zhang | H04W 72/042 370/329 |
| 2014/0146756 A1 | 5/2014 | Sahin | |
| 2014/0146775 A1* | 5/2014 | Guan | H04L 5/0053 370/329 |
| 2014/0169312 A1* | 6/2014 | Wang | H04W 48/12 370/329 |
| 2014/0211695 A1* | 7/2014 | Cui | H04L 5/0092 370/328 |
| 2014/0211710 A1* | 7/2014 | Guan | H04W 28/06 370/329 |
| 2014/0211751 A1* | 7/2014 | Zhang | H04L 5/0035 370/330 |
| 2014/0269454 A1* | 9/2014 | Papasakellariou | H04L 5/1469 370/280 |
| 2014/0293843 A1* | 10/2014 | Papasakellariou | H04W 72/042 370/280 |
| 2015/0117380 A1* | 4/2015 | Zhang | H04B 7/024 370/329 |
| 2015/0208398 A1* | 7/2015 | Pan | H04L 5/0053 370/329 |
| 2015/0245340 A1* | 8/2015 | Cheng | H04W 48/12 370/331 |
| 2015/0264708 A1* | 9/2015 | Li | H04W 28/06 370/329 |
| 2015/0334660 A1* | 11/2015 | Hsieh | H04W 72/042 370/328 |
| 2015/0365937 A1* | 12/2015 | Etemad | H04B 7/0639 370/329 |
| 2016/0205680 A1 | 7/2016 | Nguyen et al. | |
| 2016/0270116 A1* | 9/2016 | Lin | H04W 72/1289 |
| 2017/0332377 A1* | 11/2017 | Tseng | H04W 72/0413 |
| 2018/0227886 A1* | 8/2018 | Chou | H04W 72/046 |
| 2019/0021072 A1* | 1/2019 | Horiuchi | H04L 1/0003 |
| 2019/0207737 A1* | 7/2019 | Babaei | H04L 27/2607 |
| 2020/0037248 A1* | 1/2020 | Zhou | H04B 7/0626 |

FOREIGN PATENT DOCUMENTS

| | | |
|---|---|---|
| CN | 102811495 A | 12/2012 |
| CN | 102860074 A | 1/2013 |
| CN | 102958184 A | 3/2013 |
| CN | 103188799 A | 7/2013 |
| CN | 103973394 A | 8/2014 |
| CN | 104168602 A | 11/2014 |
| EP | 2525616 A1 | 11/2012 |
| EP | 2663123 A1 | 11/2013 |
| EP | 2750429 A1 | 7/2014 |
| JP | 2014529208 A | 10/2014 |
| RU | 2539327 C2 | 1/2015 |
| WO | 2013013394 A1 | 1/2013 |

OTHER PUBLICATIONS

First Office Action of Russian application No. 2019100158, dated Oct. 1, 2019.
Huawei etc, "DCI design for short TTI", 3GPP TSG RAN WG1 Meeting #85 R1-164060, May 27, 2016, Sections 1-3, 5.
Ericsson, "DCI for sTTI scheduling", 3GPP TSG-RAN WG1 #85 R1-165294, May 27, 2016, Section 1-3.
LG Electronics: "Discussions on DCI and sPDCCH for latency reduction", 3GPP TSG RAN WG1 Meeting #85 R1-164542, May 27, 2016, Section 1-2.
Supplementary European Search Report in European application No. 16908509.9 dated Mar. 20, 2019.
MOTOROLA: "Common PDCCH Design Carrier Aggregation", 3GPP Draft; RI-091327, 3rd Generation Partnership Project (3GPP), Mobile Competence Centre ; 650, Route Des Lucioles ; F-06921 Sophia-Antipolis Cedex ; France, No. Seoul, Korea; Mar. 18, 2009, Mar. 18, 2009 (Mar. 18, 2009), XP050338925, [retrieved on Mar. 18, 2009] *the whole document*.
English Translation of the Written Opinion of the International Search Authority in international application No. PCT/CN2016/090228, dated Feb. 23, 2017.
International Search Report in international application No. PCT/CN2016/090228, dated Feb. 23, 2017.
Written Opinion of the International Search Authority in international application No. PCT/CN2016/090228, dated Feb. 23, 2017.
Second Office Action of the Chinese application No. 201680088189.8, dated Dec. 10, 2019.
Huawei, HiSilicon, DCI design for short TTI, 3GPP TSG RAN WG1 Meeting #84bis R1-162588, Apr. 11-15, 2016.
Office Action of the Indian application No. 201817048347, dated Jul. 31, 2020.
First Office Action of the Brazilian application No. BR1120190006150, dated Jul. 30, 2020.
3GPP TS 36.212 V13.2.0 (Jun. 2016), 3rd Generation Partnership Project; Technical Specification Group Radio Access Network; Evolved Universal Terrestrial Radio Access (E-UTRA); Multiplexing and channel coding (Release 13).
Second Office Action of the Canadian application No. 3026441, dated Sep. 15, 2020.
First Office Action of the Japanese application No. 2018-563598, dated Sep. 25, 2020.
First Office Action of the European application No. 16908509.9, dated Oct. 13, 2020.
Office Action of the Taiwanese application No. 106122645, dated Nov. 4, 2020.
NTT DOCOMO, Inc., "sPDCCH for shortened TTI", 3GPP TSG RAN WG1 Meeting #85, R1-165209, Nanjing, P. R. China May 23-27, 2016.
Samsung, "sPDCCH and sDCI design", 3GPP TSG RAN WG1 Meeting #85, R1-164793, Nanjing, China, May 23-27, 2016.
First Office Action of the Singapore application No. 11201810954X, dated Feb. 21, 2020.
Decision of Refusal of the Chinese application No. 201680086189.8, dated Apr. 1, 2020.
First Office Action of the Australia application No. 2016415070, dated Mar. 30, 2021.
Second Office Action of the Australia application No. 2016415070, dated Mar. 30, 2021.
Office Action of the Taiwanese application No. 106122645, dated Mar. 24, 2021.

* cited by examiner

WIRELESS-NETWORK-BASED COMMUNICATION METHOD, TERMINAL DEVICE, AND NETWORK DEVICE

TECHNICAL FIELD

The disclosure relates to the field of communications, and particularly relates to a wireless network based communication method, a terminal device and a network device.

BACKGROUND

In an existing network architecture, a network-side device sends Downlink Control Information (DCI) to a terminal device via a public control channel, the terminal device performs a DCI blind test according to a transmission mode in which the terminal device is located and a DCI format possibly adopted by the network-side device under the transmission mode to obtain one DCI corresponding to the terminal device, and then the terminal device performs corresponding operations on a data channel according to control information in the DCI. However, in a future 5th-Generation (5G) network architecture, the DCI includes many types of control information and transmission requirements on different types of control information may be not the same. If a method for transmitting the DCI in the existing network architecture is adopted, i.e., various types of control information of the terminal device are transmitted on one DCI, it is very difficult to meet the transmission requirements of the different types of the control information. Therefore, under a condition in which there are many types of control information and the transmission requirements on different types of control information are different, how to transmit the control information to the terminal device at a minimum control signaling overhead on the premise of meeting the transmission requirements on the different types of the control information is a problem to be solved.

SUMMARY

The disclosure provides a wireless network based communication method, a terminal device and a network device, which may meet transmission requirements on different types of control information to reduce the signaling overhead.

A first aspect provides a wireless network based communication method, which includes: a terminal device detects first DCI sent by a network device; the terminal device detects second DCI sent by the terminal device; and the terminal device sends or receives target data according to a combination of control information in the first DCI and control information in the second DCI.

The first DCI and the second DCI may include different types of control information.

Through two DCIs, the different types of control information may be sent, so that the transmission requirements on the different types of the control information can be met and the terminal device sends or receives the target data according to the control information in the two DCIs. In addition, when the different types of control information have different requirements on a transmission cycle, the different types of control information are carried by the two DCIs so that a sending cycle of the control information can be determined reasonably to save a certain signaling overhead.

In combination with the first aspect, in some implementation manners of the first aspect, the first DCI and the second DCI have different DCI formats from each other.

In combination with the first aspect, in some implementation manners of the first aspect, length of information in the first DCI is different from length of information in the second DCI and/or information content in the first DCI is different from information content in the second DCI.

In combination with the first aspect, in some implementation manners of the first aspect, that a terminal device detects first DCI sent by a network device includes: the terminal device regularly detects the first DCI sent by the network device at a first resource cycle; and that the terminal device detects second DCI sent by the terminal device includes: the terminal device regularly detects the second DCI sent by the network device at a second resource cycle.

In combination with the first aspect, in some implementation manners of the first aspect, the first resource cycle and the second resource cycle are an integral multiple of a time domain resource unit for transmitting a signal; and the first resource cycle is greater than the second resource cycle.

It should be understood that, the first resource cycle may also be smaller than or equal to the second resource cycle.

In combination with the first aspect, in some implementation manners of the first aspect, that the terminal device sends or receives target data according to a combination of control information in the first DCI and control information in the second DCI includes:

the terminal device sends or receives the target data according to a combination of control information in the second DCI detected within a current second resource cycle and control information in the first DCI detected recently.

When the first resource cycle is smaller than the second resource cycle, the terminal device may send or receive the target data in combination with the control information in the first DCI detected within a current first resource cycle and in the second DCI detected recently.

In combination with the first aspect, in some implementation manners of the first aspect, the method further includes: when the terminal device does not detect the second DCI within the current second resource cycle, the terminal device does not send or receive the data.

In combination with the first aspect, in some implementation manners of the first aspect, that a terminal device detects first DCI sent by a network device includes: the terminal device detects the first DCI on a public control channel, and/or the terminal device detects the first DCI according to public transmission parameters of a cell.

In combination with the first aspect, in some implementation manners of the first aspect, that the terminal device detects second DCI sent by the network device includes: the terminal device detects the second DCI on the public control channel, and/or the terminal device detects the second DCI on parts of frequency domain resources of a system bandwidth.

In combination with the first aspect, in some implementation manners of the first aspect, the parts of frequency domain resources are frequency domain resources indicated by the first DCI.

In combination with the first aspect, in some implementation manners of the first aspect, a control channel for carrying the second DCI and a data channel for carrying the target data occupy same time domain resources or same frequency domain resources.

In combination with the first aspect, in some implementation manners of the first aspect, the first DCI includes at least one of the following information used when the terminal device sends or receives the target data:

a sub-carrier interval;

a total number of sub-carriers under a preset bandwidth;

a total number of sub-carriers included in a Physical Resource Block (PRB);

the length of an Orthogonal Frequency Division Multiplexing (OFDM) symbol;

a total number of points used to generate an OFDM signal by Fourier transform or inverse Fourier transform;

a total number of OFDM symbols included in a Transmission Time Interval (TTI);

a total number of TTIs included in a preset time unit;

signal prefix information;

A/N feedback time sequence information;

a physical resource distribution manner; or frequency hopping configuration information.

In combination with the first aspect, in some implementation manners of the first aspect, the second DCI includes at least one of the following information used when the terminal device sends or receives the target data:

a physical resource distribution information;

uplink sending power control information;

A/N feedback time sequence information;

frequency hopping configuration information;

Hybrid Automatic Repeat Request (HARQ) progress information;

Channel State Information (CSI) reporting trigger information;

Sounding Reference Signal (SRS) transmission trigger information;

transmission block transmission information;

uplink Demodulation Reference Signal (DMRS) configuration information; or downlink DMRS configuration information.

A second aspect provides a wireless network based communication method, which includes: a network device sends first DCI to a terminal device; and the network device sends second DCI to the terminal device. Herein, the first DCI and the second DCI are used by the terminal device to send or receive target data.

Through two DCIs, the different types of control information may be sent, so that the transmission requirements on the different types of the control information can be met and the terminal device sends or receives the target data according to the control information in the two DCIs. In addition, when the different types of control information have different requirements on a transmission cycle, the different types of control information are carried by the two DCIs so that a sending cycle of the control information can be determined reasonably to save a certain signaling overhead.

In combination with the second aspect, in some implementation manners of the second aspect, the first DCI and the second DCI have different DCI formats from each other.

In combination with the second aspect, in some implementation manners of the second aspect, length of information in the first DCI is different from length of information in the second DCI and/or information content in the first DCI is different from information content in the second DCI.

In combination with the second aspect, in some implementation manners of the second aspect, that a network device sends first DCI to a network device includes: the network device regularly sends the first DCI to the terminal device at a first resource cycle; and that the network device sends second DCI to the terminal device includes: the network device regularly sends the second DCI to the terminal device at a second resource cycle.

In combination with the second aspect, in some implementation manners of the second aspect, the first resource cycle and the second resource cycle are an integral multiple of a time domain resource unit for transmitting a signal; and the first resource cycle is greater than the second resource cycle.

In combination with the second aspect, in some implementation manners of the second aspect, that a network device sends first DCI to a network device includes: the network device sends the first DCI on a public control channel, and/or the network device sends the first DCI according to public transmission parameters of a cell.

In combination with the second aspect, in some implementation manners of the second aspect, that the network device sends second DCI to the terminal device includes: the network device sends the second DCI on the public control channel, and/or the network device sends the second DCI on parts of frequency domain resources of a system bandwidth.

In combination with the second aspect, in some implementation manners of the second aspect, the parts of frequency domain resources are frequency domain resources indicated by the first DCI.

In combination with the second aspect, in some implementation manners of the second aspect, a control channel for carrying the second DCI and a data channel for carrying the target data occupy same time domain resources or same frequency domain resources.

In combination with the second aspect, in some implementation manners of the second aspect, the first DCI includes at least one of the following information used when the terminal device sends or receives the target data:

a sub-carrier interval;

a total number of sub-carriers under a preset bandwidth;

a total number of sub-carriers included in a PRB;

the length of an OFDM symbol;

a total number of points used to generate an OFDM signal by Fourier transform or inverse Fourier transform;

a total number of OFDM symbols included in a TTI;

a total number of TTIs included in a preset time unit;

signal prefix information;

A/N feedback time sequence information;

a physical resource distribution manner; or frequency hopping configuration information.

In combination with the second aspect, in some implementation manners of the second aspect, the first DCI includes at least one of the following information used when the terminal device sends or receives the target data:

a physical resource distribution manner;

uplink sending power control information;

A/N feedback time sequence information;

frequency hopping configuration information;

HARQ progress information;

CSI reporting trigger information;

SRS transmission trigger information;

transmission block transmission information;

uplink DMRS configuration information; or downlink DMRS configuration information.

A third aspect provides a terminal device, which includes a module for executing the method in the first aspect.

A fourth aspect provides a terminal device, which includes a module for executing the method in the second aspect.

A fifth aspect provides a terminal device, which includes a memory, a transceiver and a processor; the memory stores a program; the processor is configured to execute the program; and when the program is executed, the processor executes the method in the first aspect based on the transceiver.

A sixth aspect provides a terminal device, which includes a memory and a transceiver; the memory stores a program;

and when the program is executed, the transceiver is configured to execute the method in the second aspect.

A seventh aspect provides a computer readable storage medium; the computer readable storage medium stores a program code executed by the terminal device, and the program code includes an instruction for executing the method in the first aspect.

An eighth aspect provides a computer readable storage medium; the computer readable storage medium stores a program code executed by the network device, and the program code includes an instruction for executing the method in the second aspect.

BRIEF DESCRIPTION OF DRAWINGS

In order to describe the technical solutions in the embodiments of the disclosure more clearly, a simple introduction on the accompanying drawings which are needed in the description of the embodiments is given below. Apparently, the accompanying drawings in the description below are merely some of the embodiments of the disclosure, based on which other drawings may be obtained by those of ordinary skill in the art without any creative effort.

DETAILED DESCRIPTION

Figure 1:
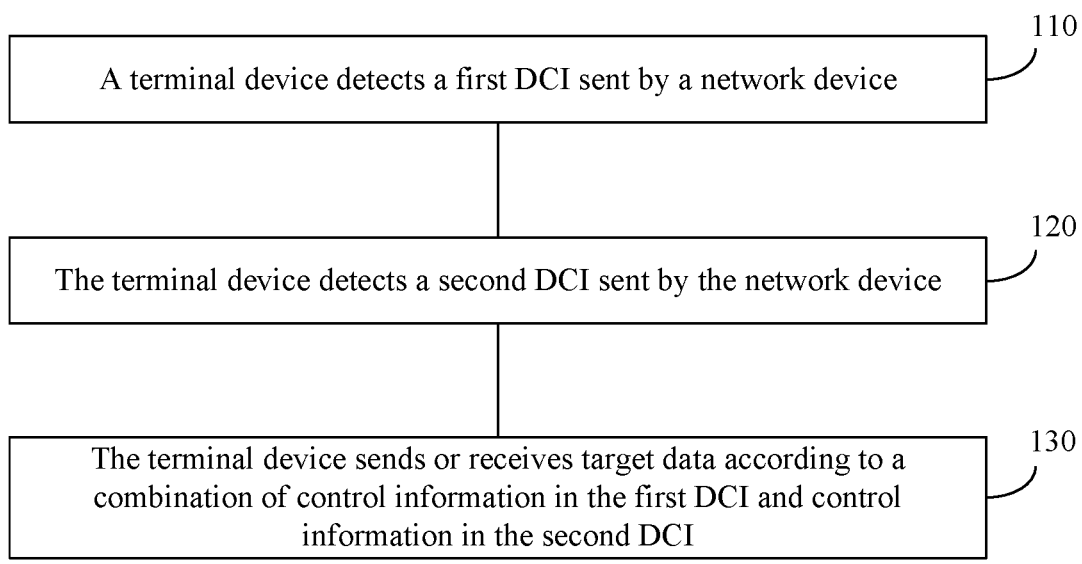
FIG. 1 is a schematic flowchart of a wireless network based communication method in an embodiment of the disclosure.

It should be understood that the technical solutions in the embodiments of the disclosure may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, and a Universal Mobile Telecommunication System (UMTS), etc. The current communication system may be particularly applied to a future 5G mobile communication technology system.

The terminal device in the embodiments of the disclosure may also be User Equipment (UE), an access terminal, a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices, vehicle-amounted devices and wearable devices connected to a wireless modulator-demodulator, and a terminal device in a future 5G network or a terminal device in a future evolved Public Land Mobile Network (PLMN), all of which are not defined in the embodiments of the disclosure.

The network device in the embodiments of the disclosure may be a device used for communicating with the terminal device. The network device may be a Base Transceiver Station (BTS) in a GSM or CDMA, may also be a NodeB (NB) in a WCDMA system, may further be an Evolutional NodeB (eNB or eNodeB) in an LTE system and may further be a wireless controller in a Cloud Radio Access Network (CRAN) scene; or the network device may be a relay station, an access point, a vehicle-amounted device, a wearable device as well as a network device in the future 5G system or a network device in the future evolved PLMN network, all of which are not limited in the embodiments of the disclosure.

In a 5G system, the terminal device may support multiple different basic parameter sets (numerology) in a carrier. These different basic parameter sets may be multiplexed by Time Division Multiplex (TDM) or Frequency Division Multiplex (FDM). Herein, the data transmission for FDM multiplexing by using different basic parameter sets may be modulated based on control information transmitted by a public control channel (such as a physical downlink control channel), and may also be modulated based on control information transmitted by an independent control channel (such as a user exclusive control channel). In addition, whichever basic parameter set is used by the terminal device specifically may be indicated by the control information to a terminal. In other words, the terminal device may be indicated by different types of control information to execute corresponding services in the future 5G system. Moreover, because the types of the control information are increased, how to transmit the control information to the terminal device at a minimum signaling overhead on the premise of meeting the transmission requirements on the different types of control information is a problem to be solved. According to the wireless network based communication method provided by the embodiments of the disclosure, multiple DICs are sent to the terminal device via the network device, so that the different types of control information may be carried in different DCIs. By separately transmitting the different DCIs, the different types of control information are transmitted to the terminal device on the premise of meeting the transmission requirements on the different types of control information and the terminal device can send or receive the target data on a data channel according to the received control information. The wireless network based communication method provided by the embodiments of the disclosure will be described below in detail in combination with FIG. 1 to FIG. 4.

FIG. 1 is a schematic flowchart of a wireless network based communication method in an embodiment of the disclosure. The method shown in FIG. 1 includes the following operations.

At 110, a terminal device detects first DCI sent by a network device.

If there are multiple DCI formats possibly used by the first DCI, the terminal device detects the DCIs respectively based on each DCI format till the first DCI is detected based on a certain DCI format. After the first DCI is detected, the terminal device may obtain control information included in the first DCI.

At 120, the terminal device detects second DCI sent by the network device.

Same as the first DCI, if there are multiple DCI formats possibly used by the second DCI, the terminal device detects the DCIs respectively based on each DCI format till the second DCI is detected based on a certain DCI format. After the second DCI is detected, the terminal device may obtain control information included in the second DCI.

In some embodiments, the first DCI and the second DCI may include different types of control information. In this way, the first DCI and the second DCI are respectively used to carry the different types of control information according to transmission requirements on the control information and thus the transmission requirements on the different types of control information are met.

In some embodiments, the first DCI and the second DCI may have different DCI formats. For example, the DCI format of the first DCI is DCI1 and that of the second DCI is DCI1A. Of course, the first DCI and the second DCI may also have the same DCI format.

In some embodiments, the first DCI and the second DCI have different formats, which may refer to that length of information in the first DCI is different from length of information in the second DCI and/or information content in the first DCI is different from information content in the second DCI. Herein, different information lengths refer to that total bit numbers of the control information included in the DCIs are different, and different information contents refer to that control information domains included in the DCIs or contents indicated by each control domain in the DCIs are different.

It should be understood that, the network device may further send a third DCI to the terminal device, so that the terminal device sends or receives target data jointly according to the control information in the first DCI, the second DCI and the third DCI. As a matter of fact, the network device may send multiple DCIs to the terminal device, so that the terminal device sends or receives the target data according to the received multiple DCIs. The number of DCIs sent by the network device is not defined in this embodiment of the disclosure.

At 130, the terminal device sends or receives target data according to a combination of control information in the first DCI and control information in the second DCI.

In this embodiment of the disclosure, through two DCIs, the different types of control information may be sent, so that the transmission requirements on the different types of the control information can be met and the terminal device sends or receives the target data according to the control information in the two DCIs. In addition, when the different types of control information have different requirements on a transmission cycle, the different types of control information are carried by the two DCIs so that a sending cycle of the control information can be determined reasonably to save a certain signaling overhead.

Specifically, the terminal device may send or receive the target data on the data channel according to target control information obtained from the first DCI and the second DCI. It should be understood that, the target control information herein includes the control information in the first DCI and the control information in the second DCI. In other words, the terminal device sends or receives the target data once according to the control information in the first DCI and the second DCI. When the terminal device obtains the first DCI and the second DCI again in a next time, the terminal device may send or receive the target data once again.

When the first DCI and the second DCI include control information for indicating the terminal device of uplink data transmission, the terminal device transmits uplink data after receiving the first DCI and the second DCI. When the first DCI and the second DCI include control information for indicating the terminal of receiving data on a downlink channel, the terminal device detects the data channel after receiving the first DCI and the second DCI to obtain the downlink data.

Optionally, as an embodiment, the terminal device may regularly performs the detection when detecting the first DCI and the second DCI. Specifically, the terminal device may regularly detect the first DCI sent by the network device at a first resource cycle and regularly detect the second DCI sent by the network device at a second resource cycle. That is to say, the network device may send the DCIs with periodic time domain resources. Specifically, the network device may respectively send the first DCI and the second DCI at the first resource cycle and the second resource cycle, and the terminal device also respectively detects the first DCI and the second DCI at corresponding resource cycles. It should be understood that, the terminal device may only perform the periodic detection on a downlink transmission channel and may also perform the periodic detection on all physical resources. In other words, the first resource cycle and the second resource cycle may be resource cycles for a downlink transmission resource (such as a downlink sub-frame), for example, the terminal device detects once every a plurality of downlink sub-frames, and may also resource cycles for all uplink and downlink transmission resources, for example, the terminal device detects once every a plurality of sub-frames and the sub-frames may be guaranteed to be downlink sub-frames via configuration.

Optionally, as an embodiment, the first resource cycle and the second resource cycle may be an integral multiple of a time domain resource unit for transmitting a signal. The time domain resource unit for transmitting the signal may be any one of a sub-frame, a wireless frame, a TTI, an OFDM symbol and a wireless frame.

When the first resource cycle is greater than the second resource cycle, some basic control information changed little along with the time may be carried by the first DCI, and the control information (such as physical resource distribution information) changed greatly with the time may be carried by the second DCI. In other words, the network device may employ a large sending cycle when sending the first DCI and employ a small sending cycle when sending the second DCI. In this way, by sending the first DCI and the second DCI via different cycles, a certain signaling overhead may be saved.

It should be understood that, it may be appropriate to set the first resource cycle to be the same as the second resource cycle or set the first resource cycle to be smaller than the second resource cycle according to the requirement on data transmitted between the network device and the terminal device. When the first resource cycle is smaller than the second resource cycle, some basic control information changed little with the time may be carried via the second DCI and some control information changed greatly with the time is carried by the first DCI.

Optionally, as an embodiment, when the terminal device respectively detects the first DCI and the second DCI at the first resource period and the second resource period, the terminal device may send or receive the target data jointly according to a combination of control information in the second DCI detected within a current second resource cycle and control information in the first DCI detected recently.

The reason is that the first resource cycle is greater than the second resource cycle, the first DCI may carry some basic parameter information and the basic parameter information is changed little with the time. By employing different cycles to send the first DCI and the second DCI, a certain signaling overhead can be saved and the data can be sent or received more flexibly.

Optionally, as an embodiment, if the terminal device does not detect the DCI within the current second resource cycle, the terminal device may not send or receive the target data. It should be understood that, when the terminal device does not detect the first DCI or the second DCI, it may refer to that the network device does not send the first DCI or the second DCI and may also refer to that the network device sends the first DCI and the second DCI and the terminal device does not detect the first DCI or the second DCI within a predetermined time. It should be understood that, when the network device does not send the first DCI or the second DCI, it may refer to that the network device side does not have a corresponding process of sending or receiving the data.

Optionally, as an embodiment, if the network device sends the first DCI to the terminal device on the public control channel, the terminal device may detect the first DCI on the public control channel. The public control channel may be a Physical Downlink Control Channel (PDCCH). In addition, the terminal device may further detect the first DCI according to public transmission parameters of the cell. The public transmission parameters of the cell may include a physical resource occupied by the control channel, a resource distribution manner, an information scrambling manner and a check manner, etc. Furthermore, the public transmission parameters of the cell are known to users in the cell. In other words, the public transmission parameters are exclusive to the cell, and as long as the network device sends the DCI to the terminal device in the cell, the terminal device in the cell may detect the DCI sent by the network device based on the public transmission parameters of the cell.

Optionally, as an embodiment, if the network device transmits the second DCI on the public control channel, the terminal device may detect the second DCI on the public control channel. In addition, when the network device does not send the second DCI to the terminal device on the public control channel, the terminal device may only detect the second DCI on parts of frequency domain resources of a system bandwidth. Herein, the parts of frequency domain resources are frequency domain resources indicated by the first DCI. For example, the network device may indicate the second DCI via the first DCI of taking frequency domain resources of some numerolgy as the parts of frequency domain resources.

Specifically, the terminal device may detect the second DCI on a special control channel of a sub-band. For example, the terminal device may detect the second DCI on an Enhanced Physical Downlink Control Channel (EPDCCH), and the terminal device may also detect the second DCI on a frequency domain resource corresponding to some numerolgy. In this embodiment of the disclosure, by indicating via the first DCI to send parts of frequency domain resources occupied by the second DCI, the terminal device only needs to detect the second DCI on the parts of frequency domain resources. Therefore, the complexity of detecting the DCI is reduced and the corresponding process is omitted.

Optionally, as an embodiment, a control channel for carrying the second DCI and a data channel for carrying the target data occupy same time domain resources or same frequency domain resources. That is to say, the network device may send the second DCI and transmit the target data to the terminal device on a same physical resource. It should be understood that, the time domain resource may be the OFDM symbol, the sub-frame and the TTI, etc., and the frequency domain resource may be the PRB, the sub-band and the sub-carrier, etc. Specifically, when the control channel of the second DCI and the data channel carrying the target data occupy the same time domain resource, the multiplexing may be performed by adopting a Frequency Division Mutiplexing (FDM) manner. At this moment, different PRBs are distributed to the control channel and the data channel of the second DCI to respectively transmit the second DCI and the target data on the data channel. When the control channel of the second DCI and the data channel of the target data occupy the same frequency domain resource, the multiplexing may be performed by adopting a Time Division Mutiplexing (TDM) manner. At this moment, different OFDM symbols are distributed to the control channel and the data channel of the second DCI to respectively transmit the second DCI and the target data on the data channel.

Optionally, as an embodiment, the first DCI may include information used when the terminal device sends or receives the target data on the data channel, and the information may specifically include at least one of the following information:

a sub-carrier interval, which is used for indicating a frequency interval between adjacent sub-carriers, for example, the sub-carrier interval may be 15 KHz and 60 KHz, etc.;

a total number of sub-carriers under a preset bandwidth, which may be used for indicating a total number of sub-carriers corresponding to each possible system bandwidth;

a total number of sub-carriers included in a PRB, which is used for indicating how many sub-carriers included in one PRB, for example, a total number of sub-carriers included in one PRB may be an integral multiple of 12, such as 12, 24 and the like;

the length of an OFDM symbol, the OFDM symbol of which may be an OFDM symbol used when the terminal device sends or receives the target data;

a total number of points used to generate an OFDM signal generated by Fourier transform or inverse Fourier transform, in which the Fourier transform may be Fast Fourier Transform (FFT) and the inverse Fourier transform may be Inverse Fast Fourier Transform (IFFT);

the number of the OFDM symbols included in a TTI, for example, the number of the OFDM symbols included in one TTI may be an integral multiple of 14 or values such as 2, 4 and 7, etc.;

a total number of TTIs included in a preset time unit, such as a total number of TTIs included in a fixed time such as 1 ms or 10 ms;

signal prefix information, which may be signal prefix information of a signal used when the terminal device sends or receives the target data and may include a time length of a cyclic prefix of the signal, and whether the cyclic prefix employs conventional cyclic prefix or extended cyclic prefix.

A/N feedback time sequence information, which is used for indicating a time sequence relationship between sending or receiving of the target data and a corresponding A/N feedback, and specifically, the A/N feedback time sequence information referring to the number of sub-frame offsets between a transmission time unit where the target data are located and a transmission time unit where a corresponding A/N feedback is located;

a physical resource distribution manner, which is used for indicating what manner is adopted to distribute a physical resource when resource distribution is performed (whether a type 0, a type 1 or a type 2 is adopted); and frequency hopping configuration information, which is used for indicating whether frequency hopping of a frequency domain is opened or not.

Optionally, as an embodiment, the second DCI may include information used when the terminal device sends or receives the target data on the data channel, and the information may specifically include at least one of the following information:

physical resource distribution information, which is used for indicating an information domain of a corresponding physical resource distribution manner, or is used for indicating a distribution information domain of a frequency domain resource occupied by the target data based on DCI scheduling, for example, the frequency domain resource may be a PRB;

uplink sending power control information, which is used for dynamically adjusting an uplink sending power of the terminal device;

A/N feedback time sequence information, which is used for indicating a time sequence relationship between sending or receiving of the target data and a corresponding A/N feedback, and specifically, the A/N feedback time sequence information referring to the number of sub-frame offsets between a transmission time unit where the target data are located and a transmission time unit where a corresponding A/N feedback is located; and frequency hopping configuration information, which is used for indicating whether frequency hopping of a frequency domain is opened or not.

HARQ progress information, indicating a corresponding HARQ progress when the terminal device sends or receives the target data on the data channel;

CSI reporting trigger information, which is used for triggering the terminal device to perform aperiodic CSI reporting;

SRS transmission trigger information, which is used for trigger the terminal device to perform aperiodic SRS reporting;

transmission-block transmission information, including transmission information on each transmission block and specifically including Modulation and Coding Scheme (MCS), New Data indicator (NDI) and Redundancy Version (RV) of the each transmission block.

uplink DMRS configuration information, used for indicating a cyclic shift of an uplink DMRS and an Orthogonal Cover Code (OCC) configuration; and downlink DMRS configuration information, used for indicating configuration information such as a port used by downlink DMRS and a scrambling sequence, etc.

The wireless network based communication method in the embodiments of the disclosure is described above in detail from a terminal device side in combination with FIG. 1. However, the wireless network based communication method in the embodiments of the disclosure will be described below in details from a network device side in combination with FIG. 2. It should be understood that the descriptions of the terminal device side and the network device side are corresponding to each other, so the portions not described in detail may be referred to the embodiment in FIG. 1.

Figure 2:
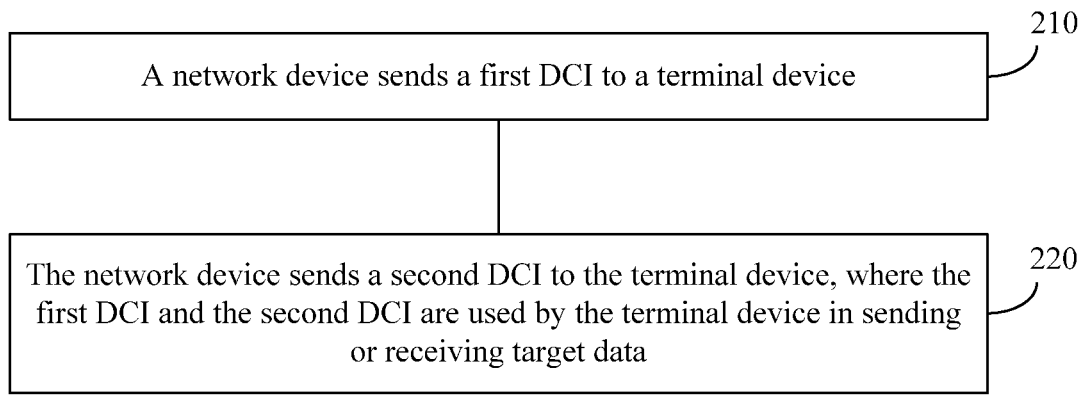
FIG. 2 is a schematic flowchart of a wireless network based communication method in an embodiment of the disclosure.

FIG. 2 is a schematic flowchart of a wireless network based communication method in an embodiment of the disclosure. The method shown in FIG. 2 includes the following operations.

At 210, a network device sends first DCI to a terminal device.

At 220, the network device sends second DCI to the terminal device, where the first DCI and the second DCI are used by the terminal device to send or receive target data.

In some embodiments, if there are multiple DCI formats possibly used by the first DCI and the second DCI, in order to obtain the first DCI and the second DCI sent by the network device, the terminal device detects the DCIs respectively based on each DCI format till the first DCI and the second DCI are detected based on a certain DCI format.

In some embodiments, the first DCI and the second DCI may include different types of control information. In this way, the different types of control information may be transmitted via the first DCI and the second DCI, and by transmitting multiple DCIs to carry different control information, the transmission requirements on the different types of control information may be met.

In some embodiments, the first DCI and the second DCI may have different DCI formats. For example, the DCI format of the first DCI is DCI1 and that of the second DCI is DCI1A. Of course, the first DCI and the second DCI may also have the same DCI format.

In some embodiments, length of information in the first DCI is different from length of information in the second DCI and/or information content in the first DCI is different from information content in the second DCI. Herein, different information lengths refer to that total bit numbers of the control information included in the DCIs are different, and different information contents refer to that control information domains included in the DCIs or contents indicated by each control domain in the DCIs are different.

In this embodiment of the disclosure, through two DCIs, the different types of control information may be sent, so that the transmission requirements on the different types of the control information can be met and the terminal device sends or receives the target data according to the control information in the two DCIs. In addition, when the different types of control information have different requirements on a transmission cycle, the different types of control information are carried by the two DCIs so that a sending cycle of the control information can be determined reasonably to save a certain signaling overhead.

Optionally, as an embodiment, the network device may regularly send the first DCI and the second DCI to the terminal device. Specifically, the network device may respectively send the first DCI and the second DCI to the terminal device at a first resource cycle and a second resource cycle.

In some embodiments, the first resource cycle and the second resource cycle may be an integral multiple of a time domain resource unit for transmitting a signal, and the first resource cycle is greater than the second resource cycle. Herein, the time domain resource unit for transmitting the signal may be any one of a sub-frame, a TTI, an OFDM symbol and a wireless frame.

Optionally, as an embodiment, the network device may send the first DCI on a public control channel, and the network device may also send the first DCI according to public transmission parameters of a cell. The public transmission parameters of the cell may include a physical resource occupied by the control channel, a resource distribution manner, an information scrambling manner and a check manner, etc. Furthermore, the public transmission parameters of the cell are known to users in the cell. In other words, the public transmission parameters are exclusive to the cell, and as long as the network device sends the DCI to the terminal device in the cell, the terminal device in the cell may detect the DCI sent by the network device based on the public transmission parameters of the cell.

Optionally, as an embodiment, the network device may send the second DCI on the public control channel, and the network device may also send the second DCI on parts of frequency domain resources of a system bandwidth. Herein, the parts of frequency domain resources are frequency domain resources indicated by the first DCI. In this embodiment of the disclosure, the network device indicates via the first DCI to send the frequency domain resources occupied by the second DCI, so that the terminal device only needs to detect the second DCI on the parts of frequency domain resources. Therefore, the complexity of detecting the DCI is reduced and the corresponding process is omitted.

Optionally, as an embodiment, a control channel for carrying the second DCI and a data channel for carrying the target data occupy same time domain resources or frequency domain resources.

Optionally, as an embodiment, the first DCI sent by the network device may include at least one of the following information used when the terminal device sends or receives the target data:

a sub-carrier interval;
a total number of sub-carriers under a preset bandwidth;
a total number of sub-carriers included in a PRB; the length of an OFDM symbol;
a total number of points used to generate an OFDM signal by Fourier transform or inverse Fourier transform;
a total number of OFDM symbols included in a TTI;
a total number of TTIs included in a preset time unit;
signal prefix information;
A/N feedback time sequence information;
a physical resource distribution manner; or
frequency hopping configuration information.

Optionally, as an embodiment, the second DCI sent by the network device may include at least one of the following information used when the terminal device sends or receives the target data:

a physical resource distribution information;
uplink sending power control information;
A/N feedback time sequence information;
frequency hopping configuration information;
HARQ progress information;
CSI reporting trigger information;
SRS transmission trigger information;
uplink DMRS configuration information; or
downlink DMRS configuration information.

The wireless network based communication method provided by the embodiments of the disclosure will be described below in detail with specific examples in combination with FIG. 3 to FIG. 4.

Figure 3:
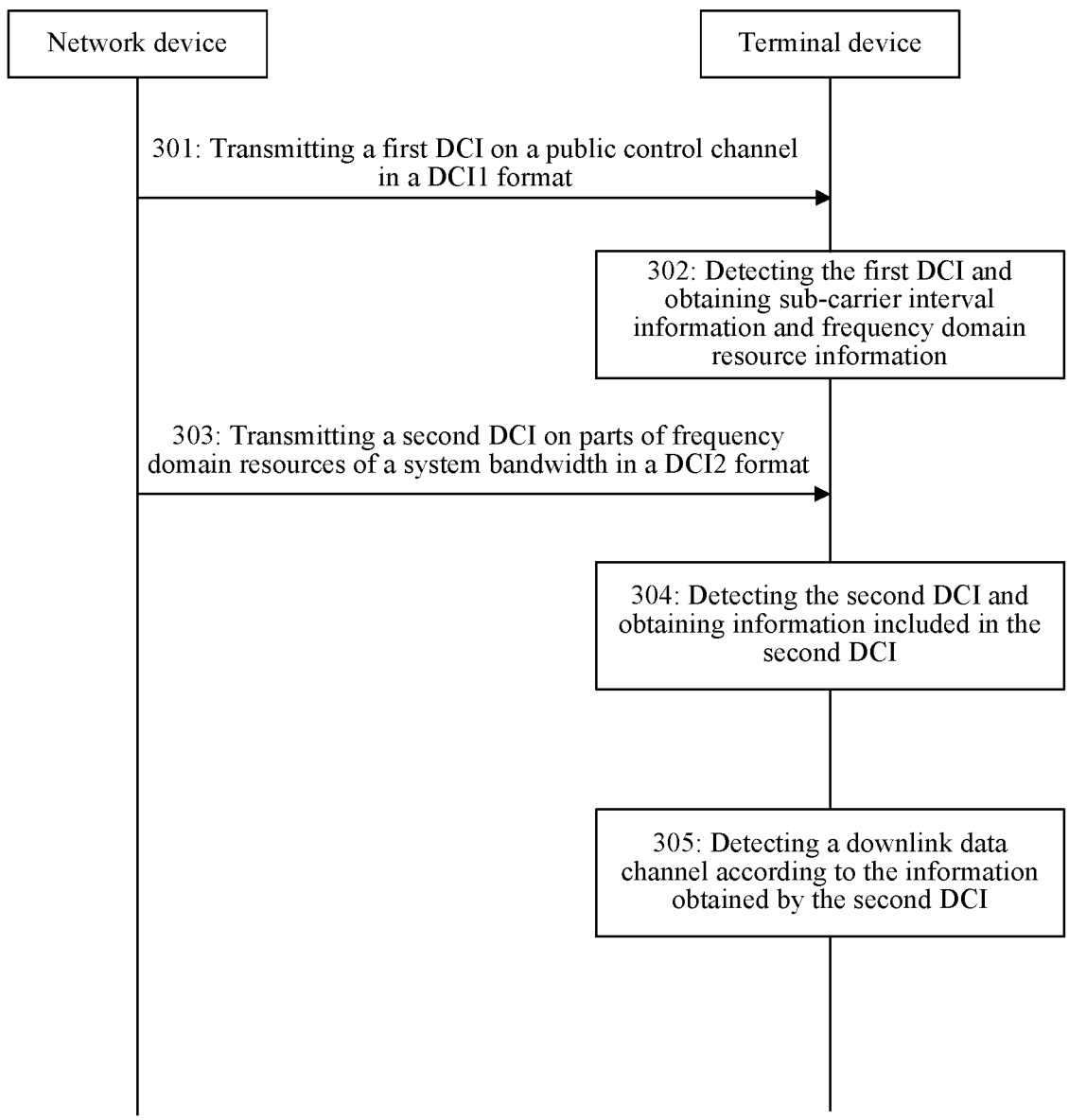
FIG. 3 is a schematic flowchart of a wireless network based communication method in an embodiment of the disclosure.

FIG. 3 is a schematic flowchart of a wireless network based communication method in an embodiment of the disclosure. The method shown in FIG. 3 includes the following operations.

At 301, a network device transmits first DCI on a public control channel in a DCI1 format.

The public control channel may occupy an overall system bandwidth, and employs a cell exclusive transmission manner when transmitting the first DCI. That is, a resource distribution manner, an information scrambling manner, a check manner and the like adopted by the public control channel are exclusive to a cell and the terminal device needs to obtain these cell exclusive parameters in advance. In this way, when the network device sends the DCI to the terminal device of the cell, the terminal device of the cell may detect the DCI sent by the network device based on the public transmission parameters of the cell.

At 302, the terminal device detects the first DCI on the public control channel in the DCI1 format and obtains sub-carrier interval information and frequency domain resource information included in the first DCI. Herein, the sub-carrier interval information in the first DCI indicates the terminal device of selecting a sub-carrier interval 1 from multiple candidate sub-carriers, and the frequency domain information indicates the terminal device of using a frequency domain resource 1 of the sub-carrier interval 1 (the frequency domain resource 1 specifically may be a Program Database (PDB) or a sub-band).

At 303, the network device transmits second DCI at the sub-carrier interval 1 in an exclusive control channel resource area of the frequency domain resource 1 in a DCI2 format.

At 304, the terminal device respectively detects the DCIs sent by the network device in multiple DCI2 and DCI3 formats at the sub-carrier interval 1 in the exclusive control channel resource area of the frequency domain resource 1 so as to detect the second DCI and obtain control information included in the second DCI. The second DCI2 may include the following information: physical resource distribution information, A/N feedback time sequence information, HARQ progress information, SRS transmission trigger information, transmission information on each transmission block and downlink DMRS configuration information.

At 305, the terminal device detects a downlink data channel at the sub-carrier interval 1 on a physical resource indicated by the second DCI based on the control information in the second DCI.

Figure 4:
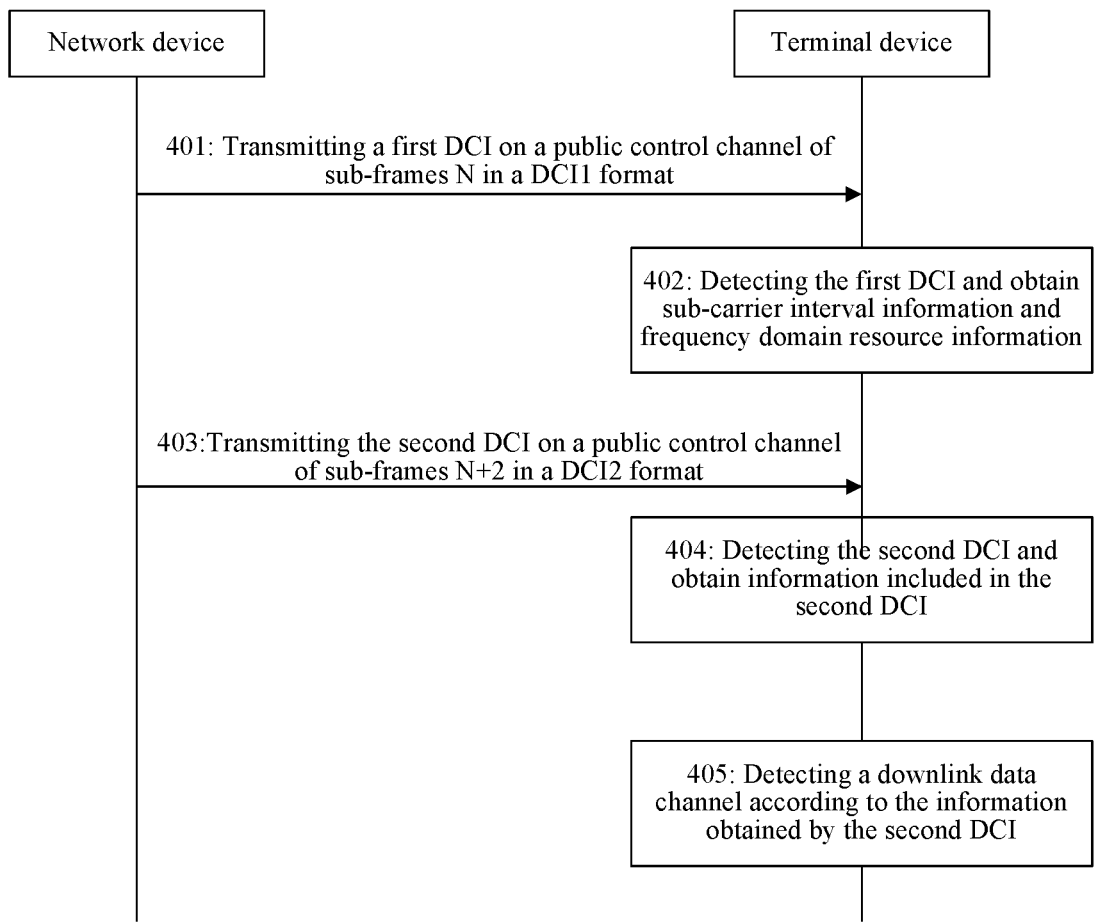
FIG. 4 is a schematic flowchart of a wireless network based communication method in an embodiment of the disclosure.

FIG. 4 is a schematic flowchart of a wireless network based communication method in an embodiment of the disclosure. The method shown in FIG. 4 includes the following operations.

At 401, a network device transmits first DCI on a public control channel of sub-frames N in a DCI1 format. Herein, each downlink sub-frame includes a public control channel, but only the public control channel having a sub-frame index number N meeting N mod T=0 (a remainder of the N to the T is equal to zero) in the downlink sub-frame can be used for transmitting the first DCI in the DCI1 format. In other words, not all of the sub-frames need to transmit the first DCI, but the first DCI is transmitted once every T sub-frames. For example, when T=5, the network device only need to transmit the first DCI once every five sub-frames.

The public control channel may occupy an overall system bandwidth, and employs a cell exclusive transmission manner. That is, a resource distribution manner, an information scrambling manner, a check manner and the like adopted by the public control channel are exclusive to a cell and the terminal device needs to obtain these cell exclusive parameters in advance. When the network device sends the DCI to the terminal device of the cell, the terminal device of the cell may detects the DCI sent by the network device based on the public transmission parameters of the cell.

At 402, the terminal device detects the first DCI on the public control channel of the sub-frames N in the DCI1 format and obtains sub-carrier interval information and frequency domain resource distribution type information included in the first DCI, where the sub-carrier interval information in the second DCI indicates the terminal device of selecting a sub-carrier interval 1 from multiple candidate sub-carriers, and the frequency domain resource distribution type information indicates the terminal device that a frequency domain resource distribution type used when data channel transmission is performed is a type 1.

At 403, the network device transmits the second DCI on a public control channel of sub-frames N+2 in a DCI2 format. The network device sends the first DCI to the terminal device once every N sub-frames and sends the second DCI to the terminal device once every N+2 sub-frames, which indicates that a cycle for sending the first DCI is smaller than that for sending the second DCI. Therefore, it may be appropriate to carry some basic control information changed little with the time in the second DCI and carry some control information changed greatly with the time in the first DCI. In this way, by sending the first DCI and the second DCI via different cycles, a certain signaling overhead may be saved.

At 404, the terminal device detects the second DCI sent by the network device in the sub-frames N+2 based on a DCI2 format to obtain control information included in the second DCI. The second DCI2 may include the following information: physical resource distribution information, uplink sending power control information, HARQ progress information, CSI reporting trigger information, SRS transmission trigger information, transmission information on each transmission block and uplink DMRS configuration information.

At 405, the terminal device transmits uplink data on a physical resource indicated by the second DCI at a frequency domain resource distribution manner 1 and a sub-carrier interval 1 according to the control information in the second DCI.

The wireless network based communication method in the embodiments of the disclosure is described above in detail in combination with FIG. 1 to FIG. 4. However, the terminal device and the network device will be described below in detail in combination with FIG. 5 to FIG. 8. It should be understood that, the terminal device and the network device in FIG. 5 to FIG. 8 can implement each step above executed by the terminal device and the network device, which will not be detailed here to avoid the repetition.

Figure 5:
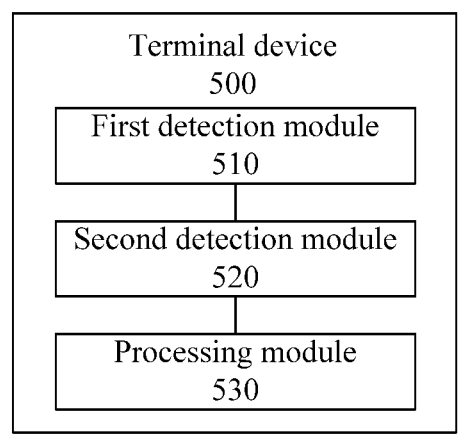
FIG. 5 is a schematic structural diagram of a terminal device in an embodiment of the disclosure.

FIG. 5 is a schematic structural diagram of a terminal device in an embodiment of the disclosure. The terminal device 500 shown in FIG. 5 may include a first detection module 510, a second detection module 520 and a processing module 530.

The first detection module 510 is configured to detect first DCI sent by a network device.

The second detection module 520 is configured to detect second DCI sent by the network device.

The processing module 530 is configured to send or receive target data according to a combination of control information in the first DCI and control information in the second DCI.

In this embodiment of the disclosure, through two DCIs, the different types of control information may be sent, so that the transmission requirements on the different types of the control information can be met and the terminal device sends or receives the target data according to the control information in the two DCIs. In addition, when the different types of control information have different requirements on a transmission cycle, the different types of control information are carried by the two DCIs so that a sending cycle of the control information can be determined reasonably to save a certain signaling overhead.

Optionally, as an embodiment, the first DCI and the second DCI have different DCI formats from each other.

Optionally, as an embodiment, length of information in the first DCI is different from length of information in the second DCI and/or information content in the first DCI is different from information content in the second DCI.

Optionally, as an embodiment, the first detection module 510 is specifically configured to regularly detect the first DCI sent by the network device at a first resource cycle, and the second detection module 520 is specifically configured to regularly detect the second DCI sent by the network device at a second resource cycle.

Optionally, as an embodiment, the first resource cycle and the second resource cycle are an integral multiple of a time domain resource unit for transmitting a signal; and the first resource cycle is greater than the second resource cycle.

Optionally, as an embodiment, the processing module 530 is specifically configured to:

send or receive the target data according to a combination of control information in the second DCI detected within a current second resource cycle and control information in the first DCI detected recently.

Optionally, as an embodiment, the processing module 530 is further configured to:

not send or receive the data when the second detection module does not detect the second DCI within the current second resource cycle.

Optionally, as an embodiment, the first detection module 510 is specifically configured to detect the first DCI on a public control channel, and/or detect the first DCI according to public transmission parameters of a cell.

Optionally, as an embodiment, the second detection module 520 is specifically configured to detect the second DCI on the public control channel, and/or detect the second DCI on parts of frequency domain resources of a system bandwidth.

Optionally, as an embodiment, the parts of frequency domain resources are frequency domain resources indicated by the first DCI.

Optionally, as an embodiment, a control channel for carrying the second DCI and a data channel for carrying the target data occupy same time domain resources or frequency domain resources.

Optionally, as an embodiment, the first DCI includes at least one of the following information used when the terminal device sends or receives the target data:

a sub-carrier interval;
a total number of sub-carriers under a preset bandwidth;
a total number of sub-carriers included in a PRB; the length of an OFDM symbol;
a total number of points used to generate an OFDM signal by Fourier transform or inverse Fourier transform;
a total number of OFDM symbols included in a TTI;
a total number of TTIs included in a preset time unit;
signal prefix information;
A/N feedback time sequence information;
a physical resource distribution manner; or
frequency hopping configuration information.

Optionally, as an embodiment, the first DCI includes at least one of the following information used when the terminal device sends or receives the target data:

a physical resource distribution manner;
uplink sending power control information;
A/N feedback time sequence information;
frequency hopping configuration information;
HARQ progress information;
CSI reporting trigger information;

SRS transmission trigger information;
transmission block transmission information;
uplink DMRS configuration information; or
downlink DMRS configuration information.

Figure 6:
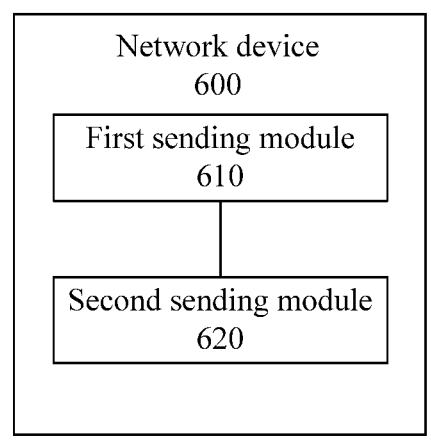
FIG. 6 is a schematic structural diagram of a network device in an embodiment of the disclosure.

FIG. 6 is a schematic structural diagram of a terminal device in an embodiment of the disclosure. The network device 600 shown in FIG. 6 may include a first sending module 610 and a second sending module 620.

The first sending module 610 is configured to send first DCI to a terminal device.

The second sending module 620 is configured to send second DCI to the terminal device, where the first DCI and the second DCI are used by the terminal device to send or receive target data.

In this embodiment of the disclosure, through two DCIs, the different types of control information may be sent, so that the transmission requirements on the different types of the control information can be met and the terminal device sends or receives the target data according to the control information in the two DCIS. In addition, when the different types of control information have different requirements on a transmission cycle, the different types of control information are carried by the two DC's so that a sending cycle of the control information can be determined reasonably to save a certain signaling overhead.

Optionally, as an embodiment, the first DCI and the second DCI have different DCI formats from each other.

Optionally, as an embodiment, length of information in the first DCI is different from length of information in the second DCI and/or information content in the first DCI is different from information content in the second DCI.

Optionally, as an embodiment, the first sending module 610 is specifically configured to regularly send the first DCI to the terminal device at a first resource cycle, and the second sending module 620 is specifically configured to regularly send the second DCI to the terminal device at a second resource cycle.

Optionally, as an embodiment, the first resource cycle and the second resource cycle are an integral multiple of a time domain resource unit for transmitting a signal; and the first resource cycle is greater than the second resource cycle.

Optionally, as an embodiment, the first sending module 610 is specifically configured to send the first DCI on a public control channel, and/or send the first DCI according to public transmission parameters of a cell.

Optionally, as an embodiment, the second sending module 620 is specifically configured to send the second DCI on the public control channel, and/or send the second DCI on parts of frequency domain resources of a system bandwidth.

Optionally, as an embodiment, the parts of frequency domain resources are frequency domain resources indicated by the first DCI.

Optionally, as an embodiment, a control channel for carrying the second DCI and a data channel for carrying the target data occupy same time domain resources or frequency domain resources.

Optionally, as an embodiment, the first DCI includes at least one of the following information used when the processing module sends or receives the target data:
a sub-carrier interval;
a total number of sub-carriers under a preset bandwidth;
a total number of sub-carriers included in a PRB; the length of an OFDM symbol;
a total number of points used to generate an OFDM signal by Fourier transform or inverse Fourier transform;
a total number of OFDM symbols included in a TTI;
a total number of TTIs included in a preset time unit;
signal prefix information;
A/N feedback time sequence information;
a physical resource distribution manner; or
frequency hopping configuration information.

Optionally, as an embodiment, the second DCI includes at least one of the following information used when the processing module sends or receives the target data:
a physical resource distribution manner;
uplink sending power control information;
A/N feedback time sequence information;
frequency hopping configuration information;
HARQ progress information;
CSI reporting trigger information;
SRS transmission trigger information;
transmission block transmission information;
uplink DMRS configuration information; or
downlink DMRS configuration information.

Figure 7:
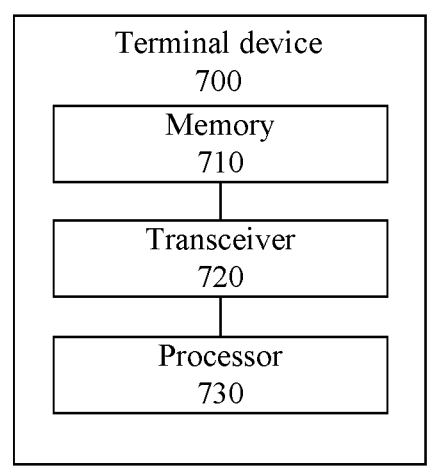
FIG. 7 is a schematic structural diagram of a terminal device in an embodiment of the disclosure.

FIG. 7 is a schematic structural diagram of a terminal device in an embodiment of the disclosure. The terminal device 700 shown in FIG. 7 may include a memory 710, a transceiver 720 and a processor 730.

The memory 710 is configured to store a program.

The transceiver 720 is configured to detect first DCI and second DCI sent by a network device.

The processor 730 is configured to execute the program stored in the memory 710; and when the program is executed, the processor 730 sends or receives target data according to a combination of control information in the first DCI and control information in the second DCI.

In this embodiment of the disclosure, through two DCIs, the different types of control information may be sent, so that the transmission requirements on the different types of the control information can be met and the terminal device sends or receives the target data according to the control information in the two DC's. In addition, when the different types of control information have different requirements on a transmission cycle, the different types of control information are carried by the two DCIs so that a sending cycle of the control information can be determined reasonably to save a certain signaling overhead.

Optionally, as an embodiment, the first DCI and the second DCI have different DCI formats from each other.

Optionally, as an embodiment, length of information in the first DCI is different from length of information in the second DCI and/or information content in the first DCI is different from information content in the second DCI.

Optionally, as an embodiment, the transceiver 720 is specifically configured to regularly detect the first DCI sent by the network device at a first resource cycle, and regularly detect the second DCI sent by the network device at a second resource cycle.

Optionally, as an embodiment, the first resource cycle and the second resource cycle are an integral multiple of a time domain resource unit for transmitting a signal; and the first resource cycle is greater than the second resource cycle.

Optionally, as an embodiment, the processor 730 is specifically configured to:
send or receive the target data in combination with the control information in the second DCI detected by the transceiver 720 within a current second resource cycle and in the first DCI detected recently.

Optionally, as an embodiment, the processor 730 is further configured to:
not send or receive the data when the transceiver 720 does not detect the second DCI within the current second resource cycle.

Optionally, as an embodiment, the transceiver 720 is specifically configured to detect the first DCI on a public control channel, and/or detect the first DCI according to public transmission parameters of a cell.

Optionally, as an embodiment, the transceiver 720 is specifically configured to detect the second DCI on the public control channel, and/or detect the second DCI on parts of frequency domain resources of a system bandwidth.

Optionally, as an embodiment, the parts of frequency domain resources are frequency domain resources indicated by the first DCI.

Optionally, as an embodiment, a control channel for carrying the second DCI and a data channel for carrying the target data occupy same time domain resources or frequency domain resources.

Optionally, as an embodiment, the first DCI includes at least one of the following information used when the terminal device sends or receives the target data:
 a sub-carrier interval;
 a total number of sub-carriers under a preset bandwidth;
 a total number of sub-carriers included in a PRB;
 the length of an OFDM symbol;
 a total number of points used to generate an OFDM signal by Fourier transform or inverse Fourier transform;
 a total number of OFDM symbols included in a TTI;
 a total number of TTIs included in a preset time unit;
 signal prefix information;
 A/N feedback time sequence information;
 a physical resource distribution manner; or
 frequency hopping configuration information.

Optionally, as an embodiment, the first DCI includes at least one of the following information used when the terminal device sends or receives the target data:
 a physical resource distribution manner;
 uplink sending power control information;
 A/N feedback time sequence information;
 frequency hopping configuration information;
 HARQ progress information;
 CSI reporting trigger information;
 SRS transmission trigger information;
 transmission block transmission information;
 uplink DMRS configuration information; or
 downlink DMRS configuration information.

Figure 8:
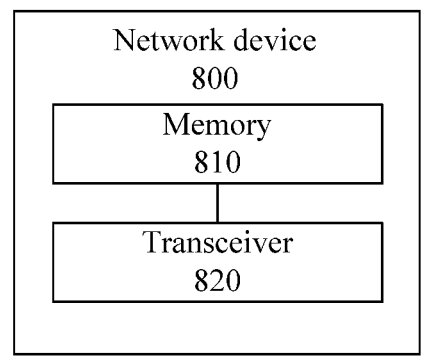
FIG. 8 is a schematic structural diagram of a network device in an embodiment of the disclosure.

FIG. 8 is a schematic structural diagram of a terminal device in an embodiment of the disclosure. The network device 800 shown in FIG. 8 may include a memory 810 and a transceiver 820.

The memory 810 is configured to store a program.

The transceiver 820 is configured to send, when the program is executed, first DCI and second DCI to the terminal device, where the first DCI and the second DCI are used by the terminal device to send or receive target data.

In this embodiment of the disclosure, through two DCIs, the different types of control information may be sent, so that the transmission requirements on the different types of the control information can be met and the terminal device sends or receives the target data according to the control information in the two DCIs. In addition, when the different types of control information have different requirements on a transmission cycle, the different types of control information are carried by the two DCIs so that a sending cycle of the control information can be determined reasonably to save a certain signaling overhead.

Optionally, as an embodiment, the first DCI and the second DCI have different DCI formats from each other.

Optionally, as an embodiment, length of information in the first DCI is different from length of information in the second DCI and/or information content in the first DCI is different from information content in the second DCI.

Optionally, as an embodiment, the transceiver 820 is specifically configured to regularly send the first DCI to the terminal device at a first resource cycle, and regularly send the second DCI to the terminal device at a second resource cycle.

Optionally, as an embodiment, the first resource cycle and the second resource cycle are an integral multiple of a time domain resource unit for transmitting a signal; and the first resource cycle is greater than the second resource cycle.

Optionally, as an embodiment, the transceiver 820 is specifically configured to send the first DCI on a public control channel, and/or send the first DCI according to public transmission parameters of a cell.

Optionally, as an embodiment, the transceiver 820 is specifically configured to send the second DCI on the public control channel, and/or send the second DCI on parts of frequency domain resources of a system bandwidth.

Optionally, as an embodiment, the parts of frequency domain resources are frequency domain resources indicated by the first DCI.

Optionally, as an embodiment, a control channel for carrying the second DCI and a data channel for carrying the target data occupy same time domain resources or frequency domain resources.

Optionally, as an embodiment, the first DCI includes at least one of the following information used when the processing module sends or receives the target data:
 a sub-carrier interval;
 a total number of sub-carriers under a preset bandwidth;
 a total number of sub-carriers included in a PRB;
 the length of an OFDM symbol;
 a total number of points used to generate an OFDM signal by Fourier transform or inverse Fourier transform;
 a total number of OFDM symbols included in a TTI;
 a total number of TTIs included in a preset time unit;
 signal prefix information;
 A/N feedback time sequence information;
 a physical resource distribution manner; or
 frequency hopping configuration information.

Optionally, as an embodiment, the second DCI includes at least one of the following information used when the processing module sends or receives the target data:
 a physical resource distribution manner;
 uplink sending power control information;
 A/N feedback time sequence information;
 frequency hopping configuration information;
 HARQ progress information;
 CSI reporting trigger information;
 SKS transmission trigger information;
 transmission block transmission information;
 uplink DMRS configuration information; or
 downlink DMRS configuration information.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that, the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the operations of the methods described in the embodiments of the disclosure. The foregoing storage medium includes any medium that can store program code, such as a Universal Serial Bus (USB) flash drive, a removable hard disk, a Read-Only Memory (ROM), a Random Access Memory (RAM), a magnetic disk, or an optical disc.

The foregoing descriptions are merely implementation manners of the disclosure but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

The invention claimed is:

1. A wireless network based communication method, comprising:
   detecting, by a terminal device, first Downlink Control Information (DCI) sent by a network device;
   detecting, by the terminal device, second DCI sent by the network device, wherein the second DCI comprises Channel State Information (CSI) reporting trigger information and/or Sounding Reference Signal (SRS) transmission trigger information used when the terminal device sends target data; and
   sending, by the terminal device, the target data according to a combination of control information in the first DCI and control information in the second DCI.

2. The method of claim 1, wherein the first DCI and the second DCI have different DCI formats from each other.

3. The method of claim 1, wherein length of information in the first DCI is different from length of information in the second DCI and/or information content in the first DCI is different from information content in the second DCI.

4. The method of claim 1, wherein detecting, by a terminal device, first DCI sent by a network device comprises:
   regularly detecting, by the terminal device, the first DCI sent by the network device at a first resource cycle; and
   detecting, by the terminal device, second DCI sent by the network device comprises:
   regularly detecting, by the terminal device, the second DCI sent by the network device at a second resource cycle.

5. The method of claim 4, wherein the first resource cycle and the second resource cycle are an integral multiple of a time domain resource unit for transmitting a signal; and the first resource cycle is greater than the second resource cycle.

6. The method of claim 4, wherein sending, by the terminal device, target data according to a combination of control information in the first DCI and control information in the second DCI comprises:
   sending, by the terminal device, the target data according to a combination of control information in the second DCI detected within a current second resource cycle and control information in the first DCI detected recently.

7. The method of claim 4, further comprising:
   not sending, by the terminal device, the target data when the terminal device does not detect the second DCI within the current second resource cycle.

8. The method of claim 1, wherein detecting, by a terminal device, first DCI sent by a network device comprises at least one of:
   detecting, by the terminal device, the first DCI on a public control channel, or detecting, by the terminal device, the first DCI according to public transmission parameters of a cell.

9. The method of claim 1, wherein a control channel for carrying the second DCI and a data channel for carrying the target data occupy same time domain resources or same frequency domain resources.

10. The method of claim 1, wherein the first DCI comprises at least one of the following information used when the terminal device sends or receives the target data:
    a sub-carrier interval;
    a total number of sub-carriers under a preset bandwidth;
    a total number of sub-carriers included in a Physical Resource Block (PRB);
    a length of an Orthogonal Frequency Division Multiplexing (OFDM) symbol;
    a total number of points used to generate an OFDM signal by Fourier transform or inverse Fourier transform;
    a total number of OFDM symbols comprised in a Transmission Time Interval (TTI);
    a total number of TTIs comprised in a preset time unit;
    signal prefix information;
    A/N feedback time sequence information;
    a physical resource distribution manner; or
    frequency hopping configuration information.

11. A wireless network based communication method, comprising:

sending, by a network device, first Downlink Control Information (DCI) to a terminal device; and sending, by the network device, second DCI to the terminal device, wherein the first DCI and the second DCI are used by the terminal device to send or receive target data;

wherein the second DCI comprises Channel State Information (CSI) reporting trigger information and/or Sounding Reference Signal (SRS) transmission trigger information used when the terminal device sends the target data.

12. A terminal device, comprising:

transceiver, configured to:

detect first Downlink Control Information (DCI) sent by a network device;

detect second DCI sent by the network device, wherein the second DCI comprises Channel State Information (CSI) reporting trigger information and/or Sounding Reference Signal (SRS) transmission trigger information used when the terminal device sends target data; and processor, configured to control the transceiver to send the target data according to a combination of control information in the first DCI and control information in the second DCI.

13. The terminal device of claim 12, wherein the first DCI and the second DCI have different DCI formats from each other, and/or wherein length of information in the first DCI is different from length of information in the second DCI and/or information content in the first DCI is different from information content in the second DCI.

14. The terminal device of claim 12, wherein the transceiver is specifically configured to:

regularly detect the first DCI sent by the network device at a first resource cycle; and regularly detect the second DCI sent by the network device at a second resource cycle, wherein the first resource cycle and the second resource cycle are an integral multiple of a time domain resource unit for transmitting a signal; and the first resource cycle is greater than the second resource cycle.

15. The terminal device of claim 12, wherein the transceiver is specifically configured to perform at least one of:

detecting the first DCI on a public control channel, or detecting the first DCI according to public transmission parameters of a cell.

16. The terminal device of claim 14, wherein the first resource cycle and the second resource cycle are an integral multiple of a time domain resource unit for transmitting a signal; and the first resource cycle is greater than the second resource cycle.

17. The terminal device of claim 14, wherein the processor is specifically configured to control the transceiver to:

send the target data according to a combination of control information in the second DCI detected within a current second resource cycle and control information in the first DCI detected recently.

18. The terminal device of claim 14, wherein the processor is further configured to control the transceiver to:

not send the target data when the transceiver does not detect the second DCI within the current second resource cycle.

19. The terminal device of claim 12, wherein a control channel for carrying the second DCI and a data channel for carrying the target data occupy same time domain resources or same frequency domain resources.

20. The method of claim 1, wherein detecting, by the terminal device, the second DCI sent by the network device comprises:

detecting, by the terminal device, the second DCI sent by the network device on parts of frequency domain resources of a system bandwidth, wherein the parts of frequency domain resources are frequency domain resources indicated by the first DCI.

* * * * *